(12) United States Patent
Subramanian et al.

(10) Patent No.: US 11,989,223 B2
(45) Date of Patent: *May 21, 2024

(54) PROVIDING MEDIA CONTENT BASED ON MEDIA ELEMENT PREFERENCES

(71) Applicant: DISH Technologies L.L.C., Englewood, CO (US)

(72) Inventors: Prakash Subramanian, Littleton, CO (US); Nicholas Brandon Newell, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 388 days.

This patent is subject to a terminal disclaimer.

(21) Appl. No.: 17/217,974

(22) Filed: Mar. 30, 2021

(65) Prior Publication Data

US 2021/0216581 A1 Jul. 15, 2021

Related U.S. Application Data

(63) Continuation of application No. 15/145,060, filed on May 3, 2016, now Pat. No. 10,984,036.

(51) Int. Cl.
*G06F 16/435* (2019.01)
*H04L 67/50* (2022.01)

(52) U.S. Cl.
CPC .......... *G06F 16/437* (2019.01); *H04L 67/535* (2022.05)

(58) Field of Classification Search
CPC ............................ G06F 16/437; H04L 67/535
USPC ....................................................... 707/733
See application file for complete search history.

(56) References Cited

U.S. PATENT DOCUMENTS

| | | | |
|---|---|---|---|
| 1,003,245 | A | 9/1911 | Emmons |
| 4,870,579 | A | 9/1989 | Hey |
| 6,205,427 | B1 | 3/2001 | Toh et al. |
| 6,321,221 | B1 | 11/2001 | Bieganski |
| 6,774,926 | B1 | 8/2004 | Ellis et al. |
| 6,978,470 | B2 | 12/2005 | Swix |

(Continued)

FOREIGN PATENT DOCUMENTS

CN 104038836 A 9/2014

OTHER PUBLICATIONS

Mao et al., "Multirelational Social Recommendations via Multigraph Ranking," IEEE, 2016, pp. 1-13.

(Continued)

*Primary Examiner* — Joshua Bullock
(74) *Attorney, Agent, or Firm* — Perkins Coie LLP

(57) ABSTRACT

A computing device is programmed to receive data collected from communications of a user. The computer identifies portions of the collected data including a keyword selected from a list of media content elements or lists of keywords associated with each of the media content elements. The computer associates each portion with a media content element. The computer further determines a score for each media content element based on at least one of the number of references, words included in the portion of collected referring to the media content element, and the voice quality of the portion of collected data referring to the media content element. Based on the scores, the computer assigns media content elements to the user. The computer recommends media content items to the user based at least in part on the media content elements assigned to the user.

20 Claims, 4 Drawing Sheets

(56) References Cited

U.S. PATENT DOCUMENTS

| | | | |
|---|---|---|---|
| 7,685,132 B2* | 3/2010 | Hyman | G06Q 30/02 707/999.01 |
| 7,958,525 B2 | 6/2011 | Karaoguz | |
| 8,180,804 B1 | 5/2012 | Narayanan et al. | |
| 8,195,460 B2 | 6/2012 | Degani | |
| 8,219,635 B2* | 7/2012 | Ganesan | H04L 67/06 709/217 |
| 8,327,395 B2 | 12/2012 | Lee | |
| 8,332,883 B2 | 12/2012 | Lee | |
| 8,510,389 B1 | 8/2013 | Gurajada | |
| 8,561,095 B2 | 10/2013 | Dimitrova et al. | |
| 8,589,968 B2 | 11/2013 | Alberth et al. | |
| 8,654,952 B2 | 2/2014 | Wang et al. | |
| 8,676,875 B1 | 3/2014 | Smith et al. | |
| 8,682,666 B2 | 3/2014 | Degani | |
| 8,694,495 B2 | 4/2014 | Saito | |
| 8,768,744 B2 | 7/2014 | Narasimhan | |
| 8,782,681 B2 | 7/2014 | Lee | |
| 8,799,953 B2 | 8/2014 | Mehta | |
| 8,849,199 B2 | 9/2014 | Shrum, Jr. | |
| 8,849,649 B2 | 9/2014 | Duong-Van | |
| 8,930,977 B1 | 1/2015 | Swift | |
| 8,973,022 B2 | 3/2015 | Lee | |
| 9,009,024 B2 | 4/2015 | Zhang et al. | |
| 9,026,476 B2 | 5/2015 | Bist | |
| 9,075,861 B2 | 7/2015 | Aravamudan | |
| 9,213,705 B1 | 12/2015 | Story, Jr. et al. | |
| 9,306,989 B1 | 4/2016 | Jayaram | |
| 9,338,493 B2 | 5/2016 | Van Os et al. | |
| 9,454,519 B1 | 9/2016 | Keysers et al. | |
| 9,679,570 B1 | 6/2017 | Edara | |
| 9,712,587 B1 | 7/2017 | Alfishawai | |
| 9,832,619 B2 | 11/2017 | Cho | |
| 10,069,971 B1 | 9/2018 | Shaw et al. | |
| 10,390,084 B2 | 8/2019 | Newell | |
| 10,764,381 B2 | 9/2020 | Newell | |
| 11,196,826 B2 | 12/2021 | Newell | |
| 2003/0063222 A1 | 4/2003 | Creed et al. | |
| 2003/0195863 A1 | 10/2003 | Marsh | |
| 2004/0001616 A1 | 1/2004 | Gutta | |
| 2005/0132401 A1 | 6/2005 | Boccon-Gibod et al. | |
| 2005/0144064 A1 | 6/2005 | Calabria et al. | |
| 2006/0159109 A1 | 7/2006 | Lamkin | |
| 2007/0288987 A1 | 12/2007 | Kim et al. | |
| 2008/0046917 A1 | 2/2008 | de Heer | |
| 2009/0030792 A1 | 1/2009 | Khivesara et al. | |
| 2009/0144071 A1 | 6/2009 | Saito et al. | |
| 2009/0144075 A1 | 6/2009 | Finn et al. | |
| 2009/0234727 A1 | 9/2009 | Petty | |
| 2010/0114937 A1 | 5/2010 | Hawthorne | |
| 2010/0138416 A1 | 6/2010 | Bellotti | |
| 2010/0273453 A1 | 10/2010 | Mikan et al. | |
| 2010/0324992 A1 | 12/2010 | Birch | |
| 2011/0238495 A1 | 9/2011 | Kang | |
| 2011/0282947 A1 | 11/2011 | Dodson | |
| 2011/0320471 A1 | 12/2011 | Hiroi et al. | |
| 2012/0005224 A1 | 1/2012 | Ahrens | |
| 2012/0266191 A1 | 10/2012 | Abrahamsson et al. | |
| 2012/0311618 A1 | 12/2012 | Blaxland | |
| 2013/0145385 A1 | 6/2013 | Aghajanyan et al. | |
| 2013/0185368 A1 | 7/2013 | Nordstrom | |
| 2013/0297638 A1 | 11/2013 | Hein | |
| 2013/0302766 A1 | 11/2013 | Gold | |
| 2013/0305169 A1 | 11/2013 | Gold | |
| 2013/0339105 A1 | 12/2013 | Russell et al. | |
| 2014/0036022 A1 | 2/2014 | Croen et al. | |
| 2014/0067953 A1 | 3/2014 | Weinstein | |
| 2014/0088952 A1 | 3/2014 | Fife et al. | |
| 2014/0089801 A1 | 3/2014 | Agrawal | |
| 2014/0108142 A1 | 4/2014 | Toebes et al. | |
| 2014/0173653 A1 | 6/2014 | Waibel et al. | |
| 2014/0188997 A1 | 7/2014 | Schneiderman et al. | |
| 2014/0195328 A1 | 7/2014 | Ferens et al. | |
| 2014/0201125 A1 | 7/2014 | Moeinifar et al. | |
| 2014/0229208 A1 | 8/2014 | Tamayo | |
| 2014/0244636 A1 | 8/2014 | Mickelsen | |
| 2014/0279751 A1 | 9/2014 | Ram et al. | |
| 2014/0298364 A1 | 10/2014 | Stepanov et al. | |
| 2014/0337427 A1 | 11/2014 | Hamada et al. | |
| 2014/0337448 A1 | 11/2014 | Kline | |
| 2014/0344039 A1 | 11/2014 | Kowalczyk | |
| 2014/0365349 A1 | 12/2014 | Kennon | |
| 2015/0020086 A1 | 1/2015 | Chen | |
| 2015/0026706 A1 | 1/2015 | Leamon | |
| 2015/0032535 A1* | 1/2015 | Li | G06Q 30/0255 705/14.53 |
| 2015/0039549 A1 | 2/2015 | Aufmann | |
| 2015/0081851 A1 | 3/2015 | Oyman | |
| 2015/0112918 A1 | 4/2015 | Zheng et al. | |
| 2015/0154960 A1 | 6/2015 | Al et al. | |
| 2015/0248618 A1* | 9/2015 | Johnson | G06F 16/635 706/46 |
| 2015/0294221 A1 | 10/2015 | Gutierrez et al. | |
| 2015/0302059 A1 | 10/2015 | Lee et al. | |
| 2016/0029057 A1 | 1/2016 | Wickenkamp | |
| 2016/0034970 A1 | 2/2016 | Musil | |
| 2016/0036939 A1 | 2/2016 | Freund | |
| 2016/0071517 A1 | 3/2016 | Beaver | |
| 2016/0119757 A1 | 4/2016 | Zang | |
| 2016/0125419 A1 | 5/2016 | Arslan | |
| 2016/0147767 A1 | 5/2016 | Manning et al. | |
| 2016/0189562 A1 | 6/2016 | Vaughan et al. | |
| 2016/0239547 A1 | 8/2016 | Lim et al. | |
| 2016/0255163 A1 | 9/2016 | Stathacopoulos | |
| 2016/0259797 A1 | 9/2016 | Lewis et al. | |
| 2016/0277787 A1 | 9/2016 | Kobayashi et al. | |
| 2016/0291921 A1 | 10/2016 | Miller et al. | |
| 2016/0352902 A1 | 12/2016 | Raanani et al. | |
| 2017/0048184 A1 | 2/2017 | Lewis et al. | |
| 2017/0134803 A1 | 5/2017 | Shaw | |
| 2017/0134901 A1 | 5/2017 | Uyanik | |
| 2017/0169726 A1 | 6/2017 | Aguirre | |
| 2017/0220570 A1 | 8/2017 | Tilaye et al. | |
| 2017/0228774 A1 | 8/2017 | Sallas et al. | |
| 2017/0295249 A1 | 10/2017 | Vickrey | |
| 2017/0322947 A1 | 11/2017 | Subramanian | |
| 2017/0324697 A1 | 11/2017 | Bastide et al. | |
| 2017/0339467 A1 | 11/2017 | Patel et al. | |
| 2017/0364854 A1 | 12/2017 | Umematsu et al. | |
| 2017/0366861 A1 | 12/2017 | Chung | |
| 2018/0040019 A1 | 2/2018 | Gavlovski et al. | |
| 2018/0082331 A1 | 3/2018 | Feldman | |
| 2018/0167678 A1 | 6/2018 | Clerx | |
| 2020/0351362 A1 | 11/2020 | Newell | |
| 2022/0019750 A1* | 1/2022 | Ravichandran | G06F 40/284 |
| 2023/0053011 A1 | 2/2023 | Newell et al. | |
| 2023/0123141 A1* | 4/2023 | Newell | G06F 9/547 719/328 |
| 2023/0126704 A1* | 4/2023 | Hurst | H04L 65/60 709/219 |

OTHER PUBLICATIONS

Hong et al., "A Comparative Study of Video Recommender Systems in Big Data Era," IEEE, 2016, pp. 125-127.

Bublitz, et al., "Using Statistical Data for Context Sensitive Pervasive Advertising," IEEE, 2014, pp. 41-44.

Kompan et al., "Context-Based Satisfaction Modeling for Personalized Recommendations," 8th International Workshop on Semantic and Social Media Adaptation and Personalization, IEEE, 2013, pp. 33-38.

Sato et al., "Recommender System by Grasping Individual Preference and Influence From Other Users," 2013 IEEE/ACM International Conference on Advances in Social Networks Analysis and Mining (ASONAM'13), ACM, 2013, pp. 1345-1351.

* cited by examiner

PROVIDING MEDIA CONTENT BASED ON MEDIA ELEMENT PREFERENCES

CROSS-REFERENCE TO RELATED APPLICATION

This patent application is a Continuation of U.S. Non-Provisional patent application Ser. No. 15/145,060, filed May 3, 2016, entitled "PROVIDING MEDIA CONTENT BASED ON MEDIA ELEMENT PREFERENCES," the disclosure of which is incorporated herein by reference in its entirety.

BACKGROUND

Users of media content are faced with difficulties in selecting from a variety of items of media content that may be available for consumption, e.g., programming that may include movies, television shows, documentaries, etc. For example, present media content delivery devices (e.g., set-top boxes and the like), could be improved with respect to the ability to determine elements of a media content item such as acting, directing, cinematography, etc. that are valued by a user.

DRAWINGS

DETAILED DESCRIPTION

Exemplary System

Figure 1:
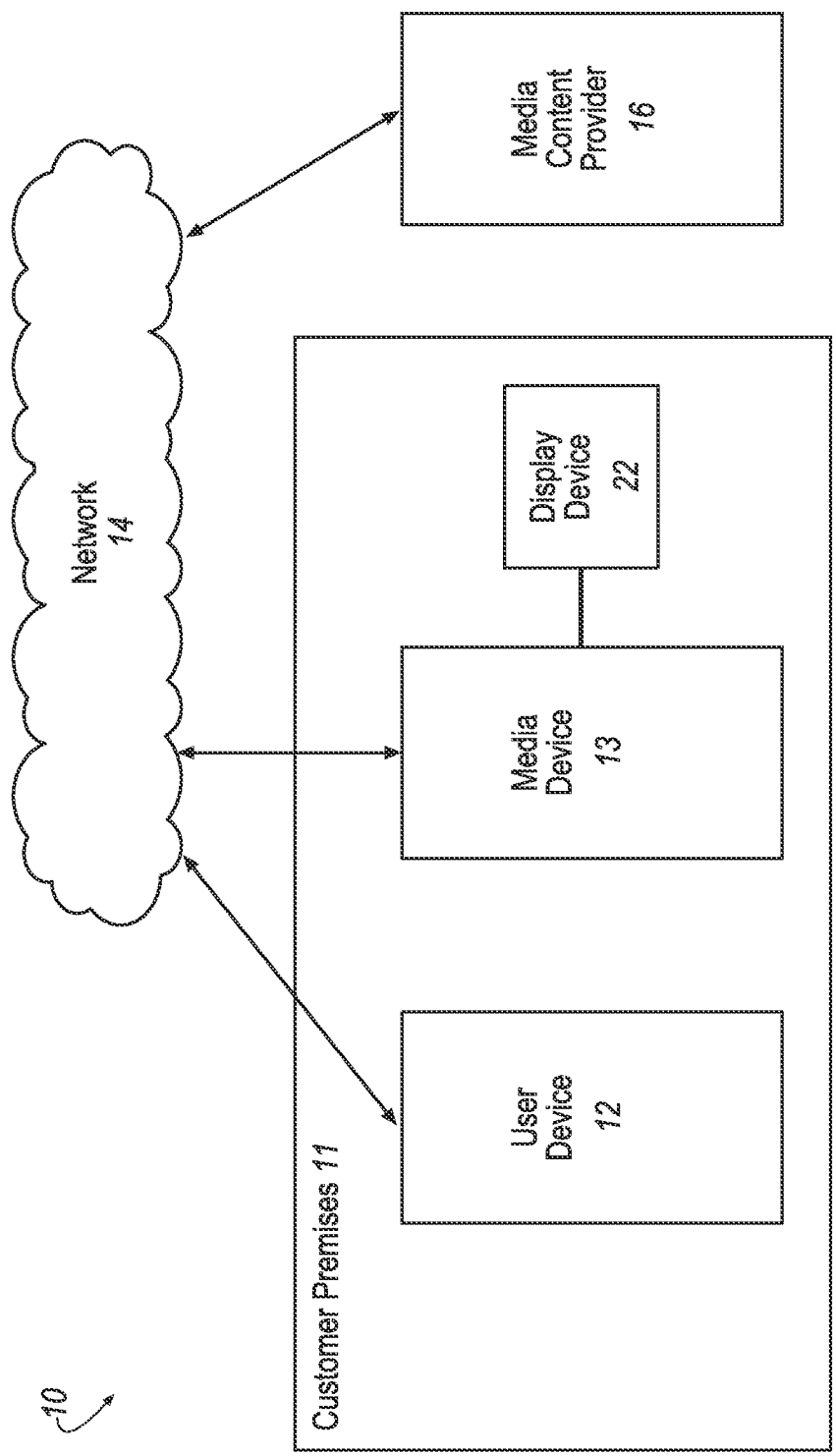
FIG. 1 is a diagram of an exemplary media system for providing media content.

A user device computer, with authorization from a user, collects data that can be used to determine elements of a media content item that are valued by the user, and additionally to identify user prioritized keywords related to the media content item. Media content elements, as used herein, refer to characteristics and/or attributes of media content items, selected from a predetermined list of media content elements. The list of media content elements can include, by way of example and not limitation, elements such as "acting", "directing", "story", "screenplay", "editing", "soundtrack", "setting", "wardrobe", "score", "cinematography", "casting", "make-up", "special effects", "animation", etc. User prioritized keywords, as used herein, are keywords associated with one or more of the media elements via a media element/keyword association table, and determined to indicate a characteristic or attribute of a media content item of prioritized interest to the user. The media element/keyword association table is described below. User prioritized keywords typically are more specific than media content elements. For example, "acting" is a typical media content element. The name of an actor, such as "Jennifer Lawrence" is a typical user prioritized keyword.

The data may include communications from or related to the user, such as media content reviews (text, audio or video), emails, texts, conversations (telephone, online chatting), social media posts, etc. The user device computer may, for example, provide the communications to a server of a media provider. The server may analyze the data to determine media content elements valued by the user and user prioritized keywords.

As described below, the media server may analyze the collected data. Based on keywords or phrases related to elements, frequency of occurrence of an element or keywords related to the element within the collected data, voice qualities associated with a portion of the collected data associated with the element, etc., the server can execute programming to determine media elements valued by the user and additionally identify user prioritized keywords. The server computer may further determine a user score for the media elements and can assign a ranking or weighting of the media elements to the user. Still further, the computer may identify one or more user prioritized keywords, such as a particular actor, a particular director, a particular subject matter (e.g., European royalty), that the user prioritizes relatively highly when selecting media content for viewing.

The server can store and maintain the data about the user. Based on stored user data, the media content provider computer is programmed to assign one or more media content elements to the user and additionally assign, when applicable, one or more user prioritized keywords. The server may further rank and/or weight the media content elements. For example, the server may determine that the first, second and third most important (mostly highly valued) media elements for a particular user are "acting", "story", and "soundtrack". The server may assign a weighting to each of the media elements. For example, "acting" may receive a weighting of 9.2 out of 10, "story" a weighting of 8.3, and "soundtrack" a weighting of 6.5. Approaches for assigning weightings are discussed below. The media server may further determine, based on communications and/or input from the user, user prioritized keywords such as "Quentin Tarantino" or "John Williams" that the user particularly values. User prioritized keywords may receive, for example, a priority weighting of 10 out of 10, or be prioritized in some other manner when selecting media content to recommend/provide to the user.

The server further maintains the media element/keyword association table. The media element/keyword association table includes the list of predetermined media elements such as "acting", "directing", etc. as described above. The table further maintains, respectively, for each media element, a list of keywords associated the media element. As described in additional detail below, each of the respective lists of keywords is updated dynamically. As an example, a portion of the media element/keyword association table may appear as follows.

TABLE 1

| Media Element | Associated Keywords |
| --- | --- |
| Acting | moving, gold-standard, crème de la crème, blurs the line between acting and reality, Jennifer Lawrence, Charlie Chaplin, etc. |
| Directing | edgy, greatest director of all times, visionary, Quentin Tarantino, etc. |
| [additional element] | [keywords associated with additional element] |

The media server is further programmed to generate and update a set of media content element ratings associated with media content items. For example, the media server may generate a rating between 0 and 10 for each of the predetermined media content elements. Upon receiving data collected from a user related to the media content item, the media server may update one or more of the media content element ratings. For example, in a case that data collected from the user indicates that the user really liked the acting in a particular media content item, the media server may increase the acting element rating associated with the media content item.

As described in additional detail below, the server may present or recommend media content items to the user based, at least in part, on the assigned user media elements, user prioritized keywords, and media content element ratings. The server determines a media content element score for each media content item for each user. The media content element score is based on a correlation of the media elements assigned to the user and the media content element ratings associated with the media content item. Based on the media content element scores for the respective media content items, and taking into consideration user prioritized keywords, the server may provide, for example, a ranked list of media content items to the user. The user may request a media content item from the ranked list. The media content provider may then provide the requested media content to the user via, e.g., the user device or the media device.

As shown in FIG. 1, an exemplary media system 10 includes one or more user devices 12, one or more media devices 13, a network 14, and a server 16. The media device 13 may be communicatively coupled to a display device 22. The user device 12, media device 13 and display device 22 may be included in a customer premise 11.

A user is a consumer (or potential consumer) of media content who provides access to various user data by the media system 10. Generally, the user operates a user device 12 which collects some or all of the data related to the user, and provides the data to the server 16. The server 16 may be provided by a media content provider such as are known, e.g., a cable or satellite media provider, an Internet site, etc.

As described in additional detail below, the user device 12, one or more data collectors associated with the user device 12, and/or other data collectors communicatively coupled to the user device 12, media device 13 or server 16, collect data regarding the user and provide the collected data to the server 16. Based on the collected data, the server 16 is programmed to determine media elements which are most highly ranked relative to the user, and assign one or more media elements to the user based on the ranking, and may further be programmed to assign one or more user prioritized keywords to the user. The server 16 may further, in some cases, assign a weighting to each of the media elements, the weighting being specific to and reflecting the determined ranking of the media elements relative to the user.

The media elements typically include elements from a predetermined list of media content elements as described above. As described above, the user prioritized keywords may be selected from keywords associated with media elements in the media element/keyword association table. The data may be collected, e.g., from one or more audio conversations, one or more e-mail messages, one or more text messages, one or more text, audio or video reviews of media content items, etc. Further, based on the media content elements assigned to the user, the server 16 may recommend or provide one or more items of media content to the user via, e.g., the media device 13.

The user device 12 is typically a known device such as a mobile telephone, tablet, smart wearable (smart watch, fitness band, etc.), other portable computing device, etc. As described in additional detail below, the user device 12 may include one or more applications such as email, a calendar, web browser, social media interfaces, etc., and one or more data collectors such as a video camera, a microphone, etc. The user device 12 may additionally include an application for collecting data related to the user from the one or more applications and one or more data collectors, and providing the collected data to the server 16 computer. The server 16 computer is sometimes referred to as the server 16 herein.

The media device 13 receives and displays media content, and is typically a known device such as a set-top box, a laptop, desktop, tablet computer, game box, etc. The term "media content" as used herein, refers to digital audio and/or video data received in the user device 12 computer and/or in the media device 13. The media content may be received, for example, from the server 16 via the network 14. Possible formats for and further examples of media content are discussed below.

The media device 13 is connected to or could include a display device 22. The display device 22 may be, for example, a television receiver, a monitor, a desktop computer, a laptop computer, a tablet, a mobile telephone, etc. The display device 22 may include one or more displays and one or more speakers for outputting respectively the video and audio portions of media content and advertisement content received from the media device 13.

The network 14 represents one or more mechanisms for providing communications, including the transfer of media content items, between the user device 12, media device 13, and the server 16. Accordingly, the network 14 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

The server 16 is typically a known computing device, e.g., such as is included in one or more of a cable or satellite television headend, a video streaming service such as generally includes a multimedia web server (or some other computing device), etc. The server 16 may provide media content, e.g., a movie, television program, documentary, etc. to the user device 12 and/or media device 13.

The media content is typically delivered as compressed audio and/or video data. For example, the data may be formatted according to known standards such as MPEG or H.264. MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided to a media device 13 in a format such as the MPEG-1, MPEG-2 or the H.264/MPEG-4 Advanced Video Coating standards (AVC) (H.264 and MPEG-4 at present being consistent) and HEVC/H.265. As is known, MPEG and H.264 data include metadata, audio, and video components. Further, media content and advertisement content in the media system 10 could alternatively or additionally be provided according to some other standard or standards. For example, media content and advertisement content could be audio data formatted according to standards such as MPEG-2 Audio Layer III (MP3), Advanced Audio Coding (AAC), etc.

Figure 2:
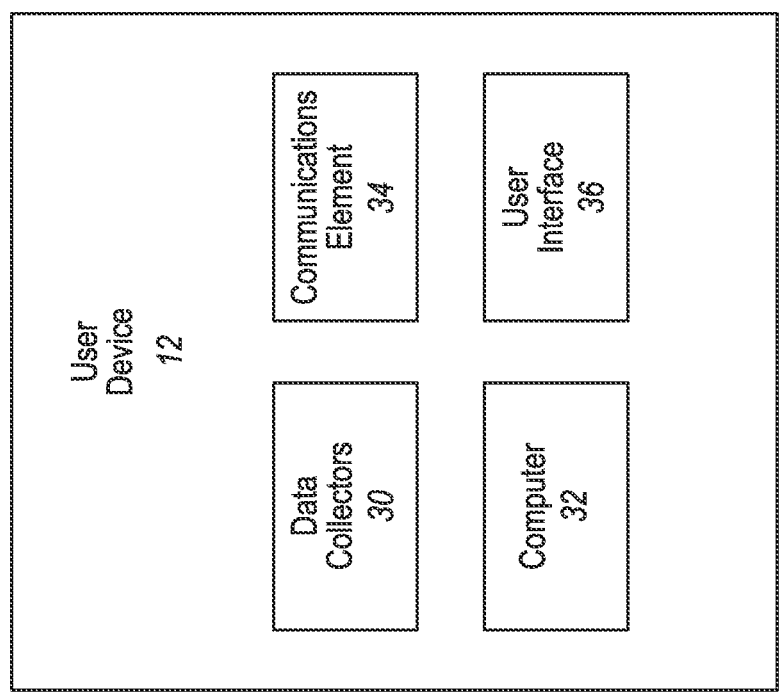
FIG. 2 is a diagram of an exemplary user device for the media system of FIG. 1.

As shown in FIG. 2, the user device 12 includes a computer 32, a communications element 34 and a user interface 36. Additionally, the user device 12 may include and/or be communicatively coupled, e.g., in a known manner, with one or more data collectors 30.

The data collectors 30 may include, for example cameras, microphones, and other types of sensors for collecting data regarding the respective user of the user device 12. The data collectors 30 are communicatively coupled to the computer 32, and may be included in or remote to the user device 12.

The data collectors 30 are provided to collect data related to the user as well as other people and objects proximate to the user device 12. "Proximate" to the user device 12 is defined, for example, as a distance that allows for the device 12 to communicate with another device, e.g., within a detection range of a respective sensor, within a same room as the user device 12, or within a fixed distance, for example 20 meters, of the user device 12. As discussed below, the computer 32 may be authorized to collect data via the data collectors 30 at any time, or based on conditions established, for example, by the user of the user device 12.

For example, a microphone in the user device 12 may monitor, on a substantially continuous basis surroundings such as a room, record conversations and provide audio data to the computer 32. The computer 32 evaluates the received data for possible use in determining media content elements and/or user prioritized keywords to be assigned to the user. The computer 32 may, for example, store data determined to be useful in determining media content elements to be assigned to the user and discard data which is determined not to be useful in determining media content elements to be assigned to the user.

The user device 12 communications element 34 may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc., for converting messages from one communications protocol to another protocol. Some operations, e.g., encoding operations, may be realized via firmware.

Types of wireless communications used in the present context may include cellular communications, Wi-Fi communications, two-way satellite communications (e.g., emergency services), one-way satellite communications (e.g., receiving digital audio radio broadcasts), AM/FM radio, etc.

The user device 12 user interface 36 may include one or more input elements such as buttons, a key board, a touchscreen, a microphone, a touchpad etc. for receiving input from a user. The user interface 36 may further include one or more display elements such as an LCD display, speaker, light emitting diodes, buzzers, etc. for outputting data to the user.

The user device 12 computer 32 includes a memory, and one or more processors, the memory storing program code, i.e., computer-executable instructions, executable by the processor. The computer 32 is operable in a known manner to receive input from the user and to transmit the input to another computing device such as the media device 13 or the server 16. The computer 32 further may include one or more applications such as are known for email, texting, social media interfaces, web browsers, etc., and may send data to and receive data from remote computers, including without limitation the server 16, for such applications.

Additionally, the user device 12 computer 32 is programmed to collect data related to the user and provide the collected data to another computing device such as the server 16. The data may be collected from other applications installed on the computer 32, or from the data collectors 30. The collected data may include, e.g., data which may be useful for determining media content elements valued by the user and for identifying user prioritized keywords. For example, the collected data may include words or phrases parsed from documents or files, e.g., from monitoring or recording voice communications, parsing e-mails, text messages, etc.

Figure 3:
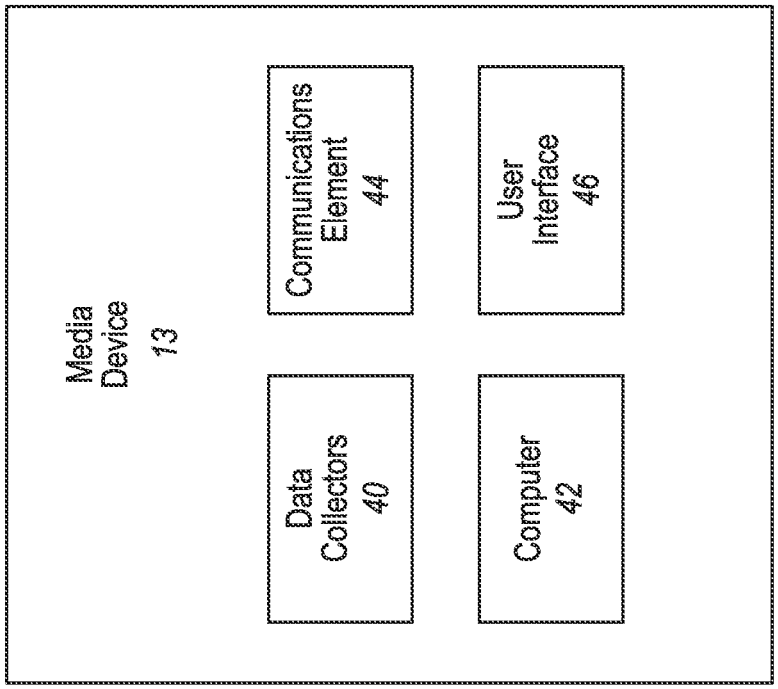
FIG. 3 is a diagram of an exemplary media device for the media system of FIG. 1.

As shown in FIG. 3, the media device 13 includes a computer 42, a communications element 44, and a user interface 46. The media device 13 may further include and/or be communicatively coupled with one or more data collectors 40. The computer 42 is communicatively coupled with each of the data collectors 40, communications element 44 and user interface 46.

The media device 13 data collectors 40 may include, for example cameras, microphones, and other types of sensors for collecting data regarding users proximate to the media device 13. Proximate to the media device 13 may be defined, e.g., as within a range to be detected by the data collectors 40. As other examples, proximate to the media device 13 may be defined to be within a fixed distance, e.g., 20 meters, of the media device 13, within a range to view a display device 22 included in the media device 13, within a room including the media device 13, etc.

The data collectors 40 are communicatively coupled to the computer 42, and may be included in or remote to the media device 13. The data collectors 40 may be used to collect visual data, audio data, etc., related to one or more users proximate to the media device 13.

The media device 13 communications element 44 includes hardware, software, and/or firmware, etc., such as are known, and can provide one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc., for converting messages from one communications protocol to another protocol. Some operations, e.g., encoding operations, may be realized via firmware, as is known.

Types of wireless communications in the context of the media device 13 may include cellular communications, Wi-Fi communications, two-way satellite communications (e.g., emergency services), one-way satellite communications (e.g., receiving digital audio radio broadcasts), AM/FM radio, etc.

The media device 13 user interface 46 may include one or more input elements such as buttons, a key board, a touchscreen, a roller ball, a touchscreen, a mouse, a microphone, switches, etc. for receiving input from a user. The user interface 46 may further include one or more display elements such as an LCD display, plasma display, speaker, lamps, light emitting diodes, buzzers, etc. for outputting data to the one or more users.

The media device 13 computer 42 includes a memory, and one or more processors, the memory storing program code, i.e., computer-executable instructions, executable by the processor. The computer 42 is operable to receive media content from the server 16 and display received media content on the display device 22.

Additionally, the computer 42 is may be programmed to collect data regarding the users proximate to the media device 13. The data may be collected, via, e.g., the data collectors 40. The collected data may include, e.g., data to be evaluated by the server 16 for determining the media content elements and user prioritized keywords to be assigned to the user.

The server 16 may provide media content to the user device 12 and/or media device 13. The server 16 may include one or more processors and memories as is known, as well as known mechanisms for communicating via the network 14.

The memory of the server 16 can store program code, i.e., computer-executable instructions, executable by the processor. The server 16 is programmed to provide media content to the user device 12 and/or media device 13, via the network 14.

Additionally, the server 16 may be programmed to receive data related to media content elements and/or user prioritized keywords to be assigned to the user. Based on the data, and as described in additional detail below, the server 16 may be programmed to assign to the user one or more media elements determined to be valued by the user. For example, as described below, the server 16 may determine scores for each of the media elements relative to the user, and assign the three media elements with the highest scores to the user. The media elements may be selected from a predetermined list of media elements. Additionally, the server 16 may be programmed to assign one or more user prioritized keywords to the user. The server 16 may further be programmed to provide one or more media content items to the user based on the assigned media content elements and the user prioritized keywords. In some cases the server 16 may recommend one or more media content items to the user, e.g., in an Electronic Program Guide or the like, based on the media elements assigned to the user and the user prioritized keywords. The server 16 may then receive a request for a media content item selected by the user from the one or more recommended media content items, and provide the media content to the user based on the request.

The server 16 includes a communications element. The communications element may include hardware, software, firmware, etc., such as are known, to provide one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc., for converting messages from one protocol to another protocol. Some functions, e.g., encoding functions, may be realized via firmware.

The communications element may be programmed to transmit and receive media content, e.g., via satellite and/or wired (cable) communications. Additionally, the communications element may be programmed for wireless communications such as cellular communications and Wi-Fi communications.

Processes
Collecting User Data

As described above, the device 12 computer 32 may collect various types of data related to the user.

The computer 32 may collect the data via data collectors 30 included in or communicatively coupled to the computer 32. For example, the computer 32 may receive audio data. The computer 32 may detect, for example, when the user is speaking with another person, and record the speech. The speech may between people who are in a same room and speaking face-to-face. Alternatively, the speech may be, for example, a phone call which is conducted with aid of the user device 12. In some cases, the audio data may be a review of a media content item by the user.

As another example, the computer 32 may receive a video recording including both audio and visual data from the data collectors 30. The video recording may capture the user speaking with another person regarding a media content item. As with the audio data, in some cases, the video recording may be a review of a media content item by the user.

In addition to collecting data via the data collectors 30, the computer 32 may collect data related to the user from other sources. The data may include words or phrases parsed from sources such as text communications (emails, texts, chats, etc.) social media posts, reviews submitted in a digital format, etc. For example, the user device 12 computer 32 may monitor emails sent by the user.

In some cases, the computer 32 may collect data from the user interactively. For example, the computer 32, may (e.g., via a speech program or user interface) ask the user the user's opinion regarding a media content item. The computer 32 may record the user's response.

As described below, the computer 32 may determine whether the collected data relates to a media content item. "Relating to a media content item" as used herein, means that the data discusses, describes, is in response to, or includes user opinions about the media content item. In the case that the data is determined to relate to the media content item, the computer 32 may provide the data to, for example, the server 16, which may use the data to determine media elements which are to be assigned to the user.

Alternatively, the computer 32 may provide the collected data from the user communications to the server 16, and the server 16 may determine which items of data relate to media content items.

Determining that an Item of Collected Data is Related to a Media Content Item

The user device 12 computer 32 or the server 16 determines, based on one or more criteria, that an item of collected data is related to a media content item.

In some cases, the user device 12 computer 32 or server 16 determines that the collected data is related to a media content item based on input from the user. For example, the user may generate a review of a media content item (audio, video, text), and indicate that the review is related to the media content item. The user may, for example, input the title of the media content item into the user interface 36 of the user device 12.

In other cases, the computer 32 may determine that an item of collected data is related to a media content item based on the occurrence of the title, a portion of the title, or other reference to the media content item in the item of collected data. For example, the computer 32 may determine that collected data including "Mockingjay", or the "latest Hunger Game movie" (together with a date of the communication), etc. refers to "The Hunger Games: Mockingjay—Part 2."

Similarly, the computer 32 may determine that an item of collected data is related to a media content item based on keywords related to the media content item. For example, mentioning of a character, such as "Katniss" may indicate that the item of collected data refers to "The Hunger Games: Mockingjay—Part 2". Keywords may be, for example, characters, actors, directors, scenes, songs, etc. that are related to the media content item.

Still further, the computer 32 may determine that an item of collected data is related to a media content item based on situation or context. For example, the computer 32 may know, based on, for example, information from the media device 13, that the user is watching, or has completed watching an item of media content such as a movie. The computer 32 may infer, for example, based on timing that a social media post from a user indicating that "the acting in this movie is amazing" likely refers to the acting in the movie currently being presented on the media device 13. As above, the computer 32 may parse words or phrases from the social media post to determine the user reaction to the movie.

The above examples of determining that an item of communication is related to a media content item are only intended as examples, and are not limiting.

Identifying References to Media Elements in the Data

The server 16 may analyze collected data received from a user device 12, media device 13, etc. and identify, based on the analysis, references to media elements in the collected data.

As a first example, the server 16 may search for occurrences of the media elements within the collected data. The media elements for which server 16 searches may be taken from a predetermined list of media elements. As described above, the predetermined list of media elements may include elements that go into creating a media content item such as "acting", "directing", "story", "screenplay", "editing", "soundtrack", "setting", "wardrobe", "score", "cinematography" "casting", "make-up", "special effects", "animation", etc. The server 16 is typically programmed to locate occurrences of media elements within the collected data, and using text parsing and/or analysis techniques, as are known, identify or define particular phrases or groupings of words within the collected data which include the media elements.

As another example, the server 16 may search the data for keywords associated respectively with each of the media elements. As described above, the server 16 may maintain a media element/keyword association table. The media element/keyword association table indicates keywords associated with each media element.

For example, for the element "acting", the table of associated keywords may include words and phrases such as "crème de la crème", "captures the full breadth of the character", "true screen presence", "remarkable talent", etc. The list of associated keywords may further include, e.g., the names of actors.

Similarly, for the element "animation", a list of keywords may include words and phrases such as "imaginative", "lifelike movements", "nuanced facial expressions", etc.

The server 16, upon finding these keywords in the collected data, identifies a media element associated with the keyword, based on the media element/keyword association table, and determines that a portion of the collected data including the keyword refers to the media element.

In some cases, a keyword may be associated with more than one media element. For example, the keyword "crème de la crème" may be associated with the media element "actor" and may further be associated with the media element "director." In such cases, the computer 32 may determine whether the portion of the collected data including the keyword refers to "actor" or "director" based on context. For example, in the case that the portion of the collected data includes the name of an actor, the server 16 may determine that "crème de la crème" refers to "acting". In some cases, the server 16 may not be able to determine to which media element the keyword refers. In such cases, the server 16 may, for example, decide not to use that particular portion of the collected data for determining user element values or media content element ratings.

Determining Score Indicating Relative Importance of a Media Element to the User

Based on data from one or more communications, and as described below, the server 16 may determine media elements that the user more highly values than others, and assign, to the user, one or more of the media elements determined to be most highly valued by the user. The server 16 may further, also as described below, assign a weighting, for each respective media element, indicating a determined relative importance of the media element to the user.

As a first indication that a media element is valued by a user, the server 16 may determine a number of references to the element within the collected data. For example, a large number of references to "soundtrack" may indicate that the user values the media element "soundtrack." As described above, the references may be direct references to "soundtrack," or may be references to keywords associated with "soundtrack", e.g., "music", "inspired melodic themes", etc.

The server 16 may rank the media elements based on the number of references to each media element in the collected data, with the media element or elements receiving the greatest number of references being ranked first, and the media element or elements receiving the least number of references ranked last. The server 16 may assign a score or partial score to each of the media items based on their ranking. For example, media elements ranked first may receive 10 points and media elements ranked last may receive zero points, and media elements in between receiving points based on their relative position in the ranking.

As an additional indication that a media element is valued by the user, the server 16 may identify words in a portion of the collected data related to the media element indicating that the user values the respective element. A portion of communication may be, e.g., one or more of a sentence, a phrase, a first fixed number of words prior to a keyword or element, a second fixed number of words following a keyword or element, etc.

For example, the server 16 may identify the sentence "I love Charlie Chaplin's acting in . . . ," and determine that the user values the media element "acting." As another example, the server 16 may identify the sentence "Charlie Chaplin is the gold standard for comedic acting." Identifying "gold standard" within the same sentence as "acting" may be an indication that the user values "acting."

Scores or partial scores may be assigned to the media elements based on the words found in the portion of the collected data related to the media element. For example, the words and phrases may be assigned values, which may then be used to determine scores for a media element, as shown in the following table.

TABLE 2

| Word or Phrase associated with "Acting" | Value |
|---|---|
| crème de la crème | 10 |
| gold standard | 10 |
| love | 9 |
| competent | 6 |
| unconvincing | 1 |

The server 16 may, for example, identify words (which may be, but do not need to be, keywords from the media element/keyword association table), and determine a score for the media element based on the relative values of the words. For example, the server 16 could take an average of all of the words associated with the media element within the collected data.

As yet an additional indication, voice quality analysis, as is known, may be used to determine media elements valued by the user. For example, the user may record a video review of "The Martian." The server 16 may analyze the video review for voice qualities such as tone, volume, inflection, pitch, speed, contrast, etc., as is known. The server 16 may compare the data to data for the general population, or for a demographic segment thereof, e.g., according to age, gender, etc., of the user. Such comparison, using the general population data as a baseline, can be used to evaluate a user mental state, e.g., a user may have a positive or negative mental state that could be quantified as a percentage worse or better than the general population. For example, speech at a speed within a particular range may indicate that the user is excited or agitated. Speech at a speed below a speed threshold may indicate that the user is relaxed. Speech in a monotone voice, i.e., with variation in tone not exceeding a predetermined range, may indicate that the user is bored.

Additionally or alternatively, the server 16 may analyze the voice samples in comparison to one or more baseline samples of the user. For example, the server 16 may request a baseline voice sample from the user when the user is happy and another baseline sample when the user is angry, etc. The server 16 may analyze the current voice samples by comparing the samples to the one or more baseline samples.

Based on the user mental state, the server 16 may determine a score indicating to what extent the user values a particular media element. For example, in the video review, the user may exclaim, "Matt Damon was amazing in this movie." Based on voice quality analysis the computer 32 may determine that the user made the statement as an exclamation, with positive emotion, and further determine that "acting" is valued by the user.

The server 16 may further determine a score or partial score for the media element based on the voice quality analysis. A high level of emotion may be assigned a 10 (excited, rapid speech, etc.) may be assigned a 10. Monotone speech may indicate a low level of emotion, and be assigned a partial score of 1 or 2.

Based on one or more of the number of occurrences of media elements in the collected data, words referring to the media elements in the collected data, and the emotional content of speech referring the media elements, the server 16 may assign user specific scores to each of the media elements, and use the user specific scores to determine a relative importance of each of the elements for the user.

The server 16 may, for example, determine a user specific score for each media element based on three partial scores. The first partial score may be based on the number of references to the media element in communications from the user. The first partial score may be a number between 0 and 10. As described above, the first partial score may be greater, the greater the number of references to the media element.

The second partial score, also as described above, may be based on words included in portions of collected data referring to the element. The second partial score may be a number between 0 and 10. As described above, values may be assigned to the words referring to the element. The second partial score may be an average of all of the words, identified in the collected data, referring to the media element.

The third partial score may be based on voice quality analysis. The third partial score may also be, for example, a number between 0 and 10. The server 16 may analyze voice quality of portions of voice data referring to a media element. Voice data with a high emotional content (excitement, enthusiasm, etc.) may indicate that the user values the media element referred to in the portion of the voice data. The server 16 may, based on the high emotional content of the voice data, assign a high partial score (e.g., 9 or 10) to the media element referred to in the portion of voice data.

The server 16 may generate first, second and third partial scores respective to the user for each media element in the list of predetermined media elements. The server 16 may then, based on an algorithm, combine the first, second and third partial scores, to generate an aggregate score for the user for each of the media elements. For example, the aggregate score may be an average of the three partial scores.

As an example, a user may, following a viewing of "The Martian", record a video review on the user device 12. The user device 12 may provide the video review to the server 16.

The video review may mention how much the user liked the acting of Matt Damon three times. The video review might further mention the "stunning cinematography" one time and the how much the soundtrack contributed to the movie.

The server 16 first evaluates the number of references of each media element in the review, resulting in the following table.

TABLE 3

| Element | Number of References | Ranking | First Partial Score |
|---|---|---|---|
| Acting | 3 | 1st | 10 |
| Cinematography | 1 | tied for second | 8.5 |
| Soundtrack | 1 | tied for second | 8.5 |
| Other (story, directing, etc.) | 0 | tied for last | 0 |

The server 16 may determine the first partial score for each respective element based on its ranking. For example, the highest ranked media element may receive a partial score of 10. The second and third ranked media elements may receive respectively 9 and 8 as first partial scores. In the case of ties, the scores for the elements that tied may be averaged. The server 16 may assign a zero to every media element that was not referenced in the collected data. In the example above, the server 16 assigns a first partial score of 10 to acting, 8.5 to cinematography and 8.5 to soundtrack.

The references to acting in the review may include phrases such as "worthy of an Oscar", "engaging" and "masterful". The server 16, based on, for example, values stores together with these keywords, assign the following values to each phrase. The reference to cinematography may include the phrase "stunning cinematography". The reference to soundtrack may include the phrase "contributed greatly to the impact of the movie". Based on these phrases, the server 16 may assign values to each phrase as follows:

TABLE 4

| Phrase | Referenced Media Element | Value of phrase based on word content |
|---|---|---|
| Worthy of an Oscar | Acting | 10 |
| Engaging | Acting | 7 |
| Masterful | Acting | 8 |
| Stunning Cinematography | Cinematography | 10 |
| Contributed greatly to the impact of the movie | Soundtrack | 7 |

The server 16 may determine the scores for the phrases based on pre-determined values for words or combinations of words found within the phrase. The media content provider may maintain, on the server 16, a table of words and associated values. For example, the word "Oscar" may be assigned a value of 10. The word "masterful" a value of 8 and the word "engaging" a value of 7. The media content provider may, for example, generate an initial list of words and associated values. The media content provider may further, on a regular basis, update the table of words and values, as new expressions are identified from users, and new words become popular.

The server 16 may analyze a phrase to identify words within the phrase having values associated with them. Words that do not add value to the phrase such as "worthy of an" may be ignored. The server 16 may further identify words that negate or invert a meaning of the phrase such as "not" and "no", and adjust the value when such words are identified. For example, the expression "not worthy of an Oscar", may be assigned a value of zero.

Based on the above table, the server 16 may assign a second partial score to acting by taking an average of the three values referring to acting resulting in a second partial score of 25/3=8.33. The server 16 may further assign a second partial score to cinematography of 10 and a second partial score to soundtrack of 7.

The server 16 may further, based on voice analysis, determine a level of emotional content for each of the phrases, and assign a value to the level of emotional content. The resulting table may appear, for example, as follows:

TABLE 5

| Phrase | Referenced Media Element | Value of Emotional Content |
|---|---|---|
| Worthy of an Oscar | Acting | 10 |
| Engaging | Acting | 9 |
| Masterful | Acting | 9 |
| Stunning Cinematography | Cinematography | 10 |
| Contributed greatly to the impact of the movie | Soundtrack | 7 |

Based on the above table, the server 16 may assign a third partial score to acting which is the average of the three emotional content values=28/3=9.67. The server 16 may further assign a third partial score to cinematography of 10 and a third partial score to soundtrack of 7.

Then, based on the first, second and third partial scores respectively for each media element, the server 16 may determine an aggregate score for each of the media content elements. The aggregate score could be, for example, the sum of the three partial scores. This may result in the following aggregate scores for the media elements:

TABLE 6

| Element | First Partial Score | Second Partial Score | Third Partial Score | Aggregate Score |
|---|---|---|---|---|
| Acting | 10 | 8.33 | 9.67 | 28 |
| Cinematography | 8.5 | 10 | 10 | 28.5 |
| Soundtrack | 8.5 | 7 | 7 | 22.5 |

Accordingly, the server 16 may rank the media element cinematography as the most valued media element for the user, acting as the second most valued media element and soundtrack as the third most valued media element.

The above example is based on data from one review for one media content item. Generally, the server 16 may receive and consider user data related to multiple media content items. The server 16 may combine (e.g., average) the scores for each of the media elements for each of the media content items, to rank the media elements relative to the user.
Assigning Media Elements to the User and Weighting Media Elements Relative to the User Based, for example, on the scores determined for each of the media elements with respect to the user, the server 16 may assign one or more media elements to the user. For example, the server 16 may select the three media elements with the highest aggregate scores and assign them to the user.

Further, the server 16 may assign a weighting to each of the media elements. The weightings may be used to determine media content items that may be of interest to the user. For example, the weighting of each element may be based on the aggregate score. For a user with the top three media elements of "acting", "directing" and "soundtrack", the server 16 may assign weightings respective weightings of 9.2, 8.3 and 6.6, reflecting the respective aggregate scores for the media elements for the user.

As another example, the weighting of each element may be based on a ranking of the media elements. For example, the highest ranked element may receive a weighting of 5, the second highest ranked element a weighting of 4, and the third highest ranked element a weighting of 3.
Determining User Prioritized Keywords In some cases, the server 16 may, based on collected data from the user, determine user prioritized keywords. As described above, user prioritized keywords are keywords associated with one or more of the media elements via a media element/keyword association table, and determined to indicate a characteristic or attribute of a media content item of prioritized interest to the user.

In some cases, the server 16 may determine that a keyword in collected data from a user is a user prioritized keyword based on a portion of the collected in which the keyword appears. For example, the user, in the collected data may exclaim "I think Quentin Tarantino is remarkable. No other director holds a candle to him. I can't wait for his next movie to come out". Based on the above data, the server 16 may identify Quentin Tarantino as a user prioritized keyword. For example, the server 16 may understand the occurrence of the expression "I can't wait" referring to "Quentin Tarantino" movies as an indication that Quentin Tarantino should be designated as a user prioritized keyword. The server 16 may prioritize every movie that is available from Quentin Tarantino for the user.

Generating/Updating Media Element Ratings for a Media Content Item

In addition to assigning media elements to a user based on collected data, the server 16 may generate or update media element ratings related to media content items based on the collected data.

As a first example, the server 16 may take into account user media element scores with respect to the media content item to determine media element ratings related to the media content items. For example, the server 16 may determine an average "acting" media element score based on all of the users for which an "acting" media element score is available.

As another example, the server 16 may alternatively or additionally take into account users, from which a movie rating is available, but for which a specific media element score is not available. For example, a user may have rated a movie a 9 out of 10. The user, based on historical data, may have been assigned "acting", "directing" and "soundtrack" as the user's top three media elements. Based on the combination of the user movie rating, and the top three media elements associated with the user, the server 16 may, for example, update the "acting", "directing" and "soundtrack" media content ratings to reflect the positive response of the user to the movie.

Other algorithms may be used. For example, the server 16 may consider both an overall media content rating and media element scores from a user related to generate/update the media element ratings for a media content item.

Further, the pool of users used to determine media element ratings for a specific item of media content may be adjusted, based, for example on the user who is requesting a media content recommendation. For example, the server 16 may generate a custom set of media element ratings for a user, based solely, or on a prioritized basis, on identified "friends" of the user. "Friends" as used herein, may be users that the user has identified as "friends" for the application, or, for example, "friends" as identified based on associations identified in email exchanges, social media activities, etc.

As another example, the pool of users used to determine media element ratings for a particular user may be selected based on demographic data such as age, gender, geographic location, etc.

Recommending Media Content to a User Based on Media Elements and User Prioritized Keywords Assigned to the User and Media Element Ratings for Media Content Items The server 16 recommends media content items to the user based on media elements assigned to the user, user prioritized keywords, and media element ratings for the media content items. Generally, the server 16 identifies and recommends media content having strong ratings for elements that correspond to the elements assigned to the user. Additionally, as described above, the server 16 recommends, on a prioritized basis, media content items having characteristics and/or attributes corresponding to user prioritized keywords.

Initially, the server 16 may identify media content items including characteristics and/or attributes corresponding to user prioritized keywords. For example, in a case that the user has been assigned the user prioritized keyword "Quentin Tarantino," the server 16 will first identify available media content items directed by Quentin Tarantino. Media content items including characteristics and/or attributes corresponding to user prioritized keywords may be recommended to the user on a prioritized basis. For example, they may be placed at the top of a list of recommended media content items.

Further, the server 16 may select, from available media content items which correlate with the media elements assigned to the user. For example, in the case that the user has been assigned "acting", "directing" and "soundtrack" as his top three (mostly highly valued) media elements, the server 16 may recommend media content items to the user which have received high ratings for the media elements "acting", "directing" and "soundtrack". A variety of algorithms may be used to rank movies based on a correlation of the media elements assigned to the user and the media element ratings of the media content item.

As a first example, the server 16 may identify media content items for which the top three rated elements correspond respectively to the top three media elements assigned to the user. In order to further rank the media content items for the user, the server 16 may generate a "user-specific score" by adding together the ratings of the top three elements for each media content item. The server 16 may rank the media content items based on the "user-specific score."

In a case where the server 16 assigned a user-specific weighting to each of the media elements assigned to the user, the server 16 may generate a "user-specific score" for each media content item which takes into account the user-specific weighting for each media element, and further takes into account the media content rating for each element.

Following the identification of media content items including characteristics or attributes corresponding to user prioritized keywords, and further identifying media content items having a strong correlation with user assigned media elements, the server 16 recommends media content items to the user. For example, the server 16 may generate a list of recommended media content items, starting with the media content items including user prioritized keywords and continuing with media content items ranked according to their correlation with user assigned media elements.

Based on the list, the user may select a media content item for viewing and request it from the server 16. The server 16 may then stream the selected media content item to the user.

Maintaining and Updating a Media Element/Keyword Association Table

The server 16 may maintain and update a media element/keyword association table, as shown above. The association table may include one or more media elements such as "acting", "directing", "story", "screenplay", "editing", "soundtrack", "setting", "wardrobe", "score", "cinematography", "casting", "make-up", "special effects", "animation", etc.

As indicated above, the association table may further associate keywords with each of the respective media elements. For example, for the media element "acting", the table may include words and phrases such as "crème de la crème", "captures the full breadth of the character", "true screen presence", "remarkable talent", etc., and may further include, e.g., the names of actors.

The server 16 may be further programmed to update the keywords associated with respective media elements based on collected data received from users. For example, in a case that a communication from a user includes the sentence "Charlie Chaplin is the gold standard for comedic acting", the server 16 may identify "gold standard" as a keyword which refers to "acting" and add "gold standard" to the list of keywords associated with "acting". In this manner, the media element/keyword association table will reflect current comments being made by users in collected data from the user.

Connecting a User with Other Users

The server 16 may, based on media element preferences, connect users with other users, typically users who have been assigned the same or similar media elements. For example, pending authorization from the respective users, the server 16 may share contact information of users that have been assigned the same top three media elements. As another example, the server 16 may share contact information of users that have been assigned "directing" as the most important media element.

In addition to sharing contact information, the server 16 may share other information, such as reviews of media content items from users who have been assigned the same or similar media elements. In this manner, a user may listen to (watch) reviews of other users which share their "media element" interests.

Example Process

Figure 4:
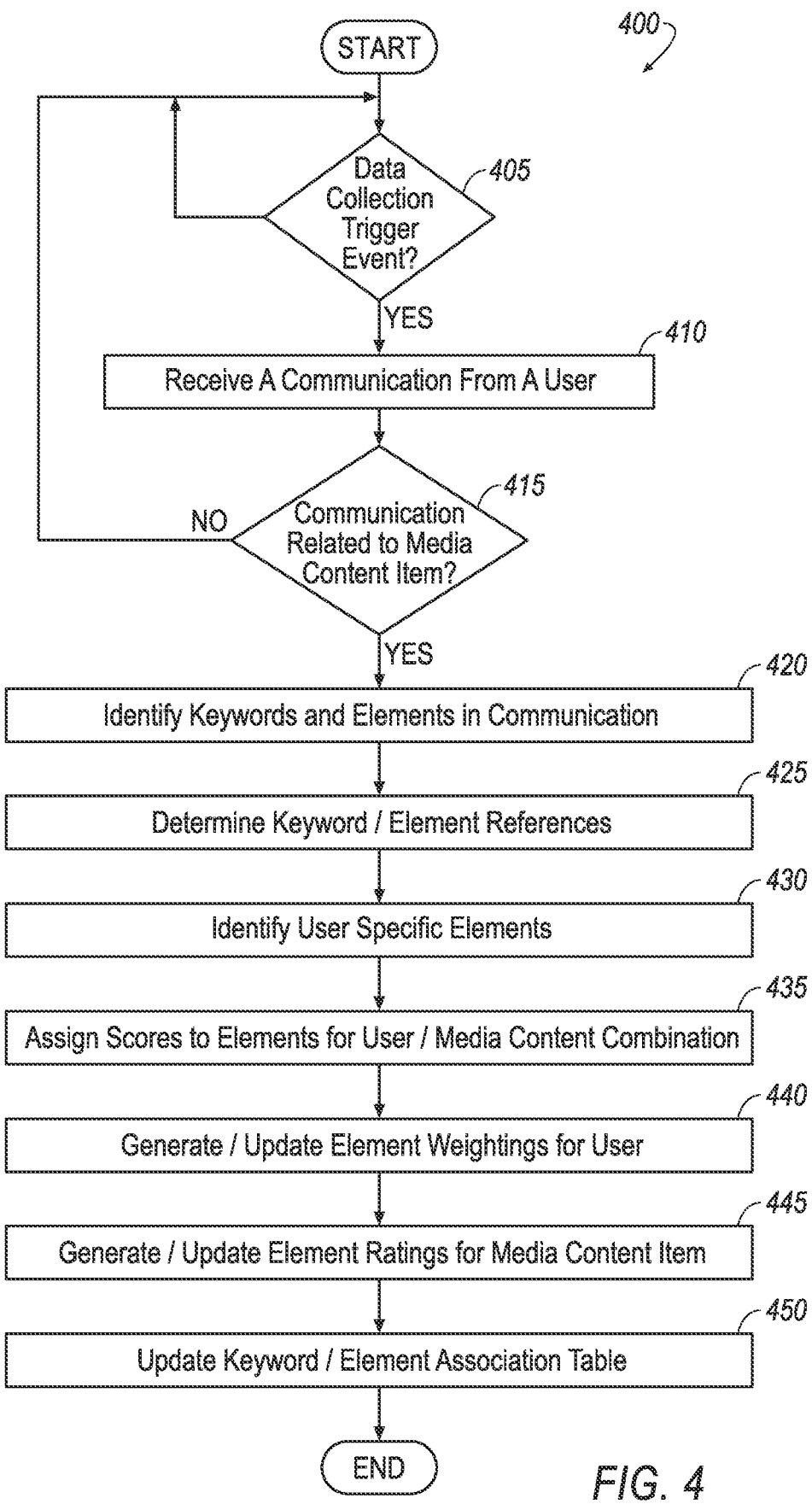
FIG. 4 is a diagram of an exemplary process for assigning media elements and user prioritized keywords to a user and updating user media element weightings and media content element ratings.

FIG. 4 is a diagram of an exemplary process 400 for determining media elements valued by a user and updating user media element weightings and media content element ratings. The process 400 begins in a block 405.

In the block 405, a computer 32 in the user device 12 determines whether a data collection trigger event has occurred. For example, the computer 32 may detect that the user is conversing with another person either face-to-face or over the telephone.

As another example, the computer 32 may be programmed to, periodically, for example, once each day, review text (emails, text messages, social media posts) etc. generated by the user. The computer 32 may, for example, be programmed to collect and analyze (or send to the server 16 for analysis) data from emails each day at 4:00 am.

As another example, the user may submit a media content review, via for example, the user interface 36. The computer 32 may recognize the interview submission as a trigger event to analyze the interview. Upon detecting a data collection trigger event, the process 400 continues in a block 410.

In the block 410, as described above, the computer 32 of user device 12 collects data related to the user, as described above. The computer 32 may collect data such as audio data from data collectors 30. Additionally, the computer 32 may collect data related to the user from other sources. The data sources may include, e.g., text-based communications such as emails, texts, conversations, etc., social media sites, etc.

The computer 32 may provide the collected data to another computing device such as the server 16.

Additionally, other computing devices, such as the media device 13 may collect data. For example, the computer 42 of the media device 13 may collect data related to the user, via data collectors 40. The computer 42 may record a conversation of the user with another person, or record a review of a media content item by the user. The computer 42 may provide the collected data, e.g., to the server 16. The process 400 continues in a block 415.

In the block 415, the server 16 analyzes the collected data, and determines whether one or more of the communications is related to a media content item, as described above. In the case that items or portions of the collected data is related to a media content item, the process 400 continues in a block 420. In the case that none of the communications received by the server 16 is related to a media content item, the process continues in the block 405.

In the block 420, the server identifies keywords and media elements included in each item of collected data (related to a media content item) as described above. Upon identifying the keywords and media elements included in the collected data, the process continues in a block 425.

In the block 425, the server 16 determines keyword/element references as described above. That is, the server 16 determines, for keywords, the media elements referenced by the keywords. The media elements referenced by the keywords may be included in the collected data, or, as discussed above may be determined based on the media element/keyword association table. Upon establishing references between keywords and media elements, the process 400 continues in a block 430.

In the block 430, the server 16 identifies user-specific elements, as described above. The process 400 continues in a block 435.

In the block 435, the server assigns scores to media elements of a particular media content item, as related to the user. As described above, the server 16 may determine a score for each media element, based on the collected data. The score may be an indication of the importance to the user for the media element. Upon assigning a score to the media elements references in the communication, the process 400 continues in a block 440.

In the block 440, the server 16 generates or updates media element weightings for the user. In a case that the user has not yet been assigned media elements, the server 16 identifies those media elements which are determined to be of most importance (have the highest score) to the user. The server 16 may assign, for example, the top three media elements to the user. The server may further assign weightings for each of the media elements assigned to the media elements, as described above.

In the case that there are already media elements assigned to the user, the server 16 may update their ranking, one to the other, and/or update weightings assigned to the respective media elements, as described above. The process 400 continues in a block 445.

In the block 445, the server 16 updates media element ratings related to the media content item, as described above. The process 400 continues in a block 450.

In the block 450, the server 16 updates a table associating keywords with media elements as described above. The process 400 then ends.

Figure 5:
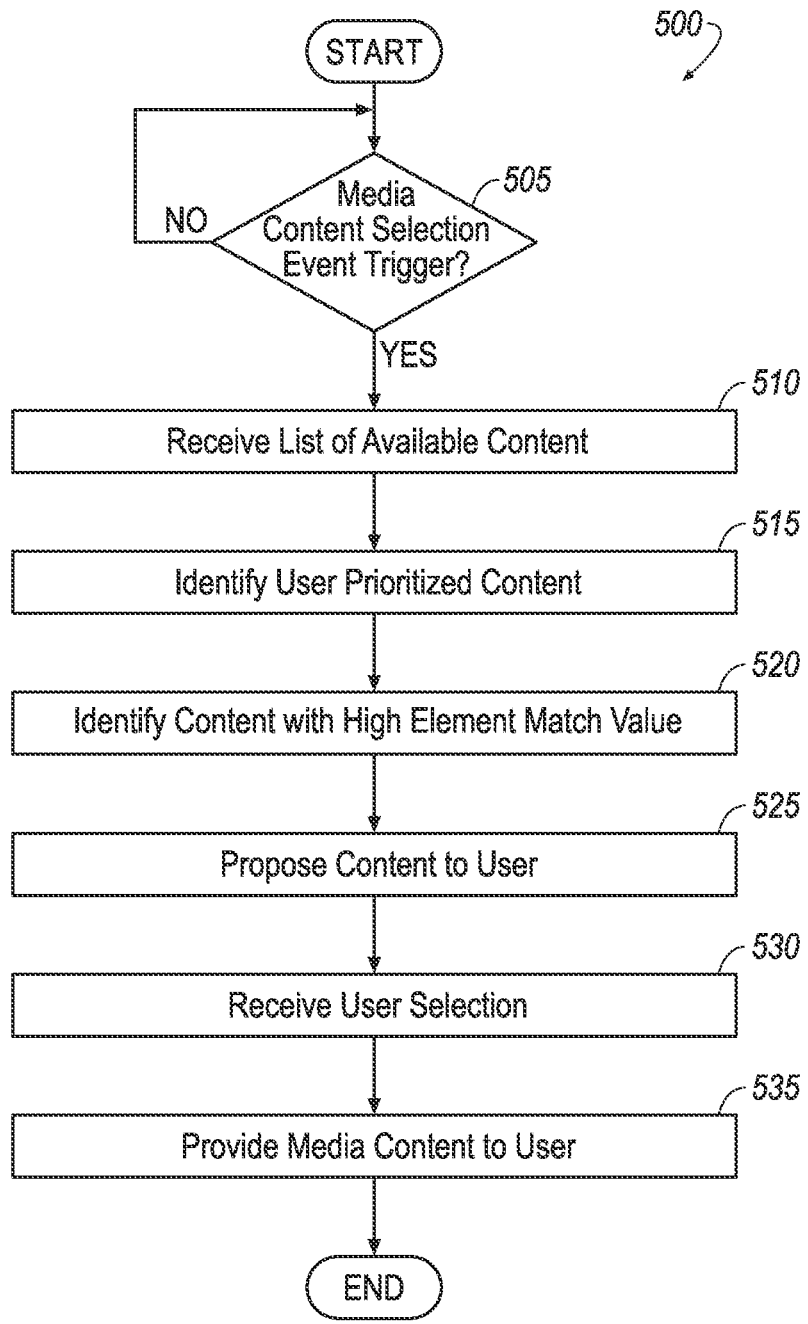
FIG. 5 is a diagram of an exemplary process for providing media content to a user based on media elements and user prioritized keywords assigned to the user and media content element ratings.

FIG. 5 is a diagram of an exemplary process 500 for providing media content to the user based on media elements assigned to the user and media content element ratings. The process 500 begins in a block 505.

In the block 505, a computing device, for example the media device 13 computer 42, determines that a trigger event has occurred indicating the user indication to select for viewing, a media content item. For example, the computer 42 may receive an input from the user turning on the media device 13 for viewing, activating an electronic programming guide (EPG), activating a menu for selecting on-demand programming, etc. In a case that the computer 42 determines that a media content selection trigger event has occurred, the process 500 continues in a block 510. In a case that the computer 42 determines that a trigger event has not occurred, the process 500 continues in the block 505.

In the block 510, the server 16 receives from the media device 13 computer 42, a request to recommend media content to the user. The server 16 identifies media content items available for viewing by the user. Upon identifying a list of available content, the process 500 continues in a block 515.

In the block 515, the server 16 identifies media content prioritized by the user. For example, as described above, one or more media content items may include user-specific media elements (for example, a preferred director). The server 16 may recommend, on a prioritized basis, the media content items including user-specific media elements to the user. The process 500 continues in a block 520.

In the block 520, the server 16 identifies media content having media element ratings with a high correlation with media elements assigned to the user, as described above. The process continues in a block 525.

In the block 525, the server 16 recommends, for example via the media device 13 user interface 46, one or more media content items to the user. As mentioned in reference to the block 515, the recommendation may include media content items including user-specific media elements. The recommendation may further include media content items having media elements ratings with a high correlation with the media elements assigned to the user. The process 500 continues in a block 530.

In the block 530, the server 16 receives a selection for media content from the user. For example, the user may select, via the user interface 46 on the media device 13, a media content item. The media device 13 computer 42 may receive the input from the user, and send an instruction to the server 16 to provide the media content. The process 500 continues in a block 535.

In the block 535, the server 16 provides the media content. For example, the server 16 may stream the media content to the media device 13 computer 42. The process 500 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method comprising:
receiving, from a user device via a network, data collected from communications of a user;
identifying, in the collected user data, keywords predetermined to be associated with a respective media content element, wherein the respective media content element is selected from a list of predetermined media content elements;
determining for each media content element in the list of predetermined media content elements, a user score, based on the keywords identified in the collected user data referring to the respective media content element;
assigning, to the user, based on the determined user score, one or more of the media content elements;
assigning, to the user, at least one of the keywords identified in the collected user data and selected from a respective list of keywords predetermined to be associated with one of the predetermined media content elements, based on the keywords included in the collected user data including the one of the respective media content elements; and transmitting, to the user device a recommendation for the user, based at least in part on the one or more assigned media content elements and the at least one of the keywords, the recommendation including one or more media content items.

2. The method of claim 1, further comprising:
updating one or more of the list of keywords predetermined to be associated with each of the respective media content elements to include words in a phrase associated with the respective media content element.

3. The method of claim 1, further comprising:
receiving, from the user, a selection of the one or more media content items in the recommendation; and
providing the one or more media content items selected by the user.

4. The method of claim 1, wherein the recommendation includes media elements ratings with a correlation above a threshold with the one or more media content elements assigned to the user.

5. The method of claim 1, wherein transmitting the recommendation further comprises:
determining correlations of the one or more media content elements assigned to the user with media content element ratings for one or more respective media content items; and
ranking the respective media content items based on the respective correlations.

6. The method of claim 5, further comprising:
updating, for the respective media content items, ratings for media content elements, based on the respective correlations.

7. The method of claim 5, further comprising:
maintaining, for each user, a weighting of media content elements assigned to the user; and
updating, based on the media content element ratings from the collected user data, the weighting of media content elements.

8. A computing system comprising:
one or more processors; and
one or more memories storing instructions that, when executed by the one or more processor, cause the computing system to perform a process comprising:
receiving, from a user device via a network, data collected from communications of a user;
identifying, in the collected user data, keywords predetermined to be associated with a respective media content element, wherein the respective media content element is selected from a list of predetermined media content elements;
determining for each media content element in the list of predetermined media content elements, a user score, based on the keywords identified in the collected user data referring to the respective media content element;
assigning, to the user, based on the determined user score, one or more of the media content elements;
assigning, to the user, at least one of the keywords identified in the collected user data and selected from a respective list of keywords predetermined to be associated with one of the predetermined media content elements, based on the keywords included in the collected user data including the one of the respective media content elements; and
transmitting, to the user device a recommendation for the user, based at least in part on the one or more assigned media content elements and the at least one of the keywords, the recommendation including one or more media content items.

9. The computing system of claim 8, wherein the process further comprises:
updating one or more of the list of keywords predetermined to be associated with each of the respective media content elements to include words in a phrase associated with the respective media content element.

10. The computing system of claim 8, wherein the process further comprises:
receiving, from the user, a selection of the one or more media content items in the recommendation; and
providing the one or more media content items selected by the user.

11. The computing system of claim 8, wherein the recommendation includes media elements ratings with a correlation above a threshold with the one or more media content elements assigned to the user.

12. The computing system of claim 8, wherein the process of transmitting the recommendation further comprises:
determining correlations of the one or more media content elements assigned to the user with media content element ratings for one or more respective media content items; and
ranking the respective media content items based on the respective correlations.

13. The computing system of claim 12, wherein the process further comprises:
updating, for the respective media content items, ratings for media content elements, based on the respective correlations.

14. The computing system of claim 12, wherein the process further comprises:
maintaining, for each user, a weighting of media content elements assigned to the user; and
updating, based on the media content element ratings from the collected user data, the weighting of media content elements.

15. A machine-readable storage medium having machine executable instructions stored thereon that, when executed by one or more processors, direct the one or more processors to perform a method comprising:
receiving, from a user device via a network, data collected from communications of a user;
identifying, in the collected user data, keywords predetermined to be associated with a respective media content element, wherein the respective media content element is selected from a list of predetermined media content elements;
determining for each media content element in the list of predetermined media content elements, a user score, based on the keywords identified in the collected user data referring to the respective media content element;
assigning, to the user, based on the determined user score, one or more of the media content elements;
assigning, to the user, at least one of the keywords identified in the collected user data and selected from a respective list of keywords predetermined to be associated with one of the predetermined media content elements, based on the keywords included in the collected user data including the one of the respective media content elements; and
transmitting, to the user device a recommendation for the user, based at least in part on the one or more assigned media content elements and the at least one of the keywords, the recommendation including one or more media content items.

16. The machine-readable storage medium of claim 15, wherein the method further comprises:

updating one or more of the list of keywords predetermined to be associated with each of the respective media content elements to include words in a phrase associated with the respective media content element.

17. The machine-readable storage medium of claim 15, wherein the method further comprises:

receiving, from the user, a selection of the one or more media content items in the recommendation; and providing the one or more media content items selected by the user.

18. The machine-readable storage medium of claim 15, wherein the recommendation includes media elements ratings with a correlation above a threshold with the one or more media content elements assigned to the user.

19. The machine-readable storage medium of claim 15, wherein the method of transmitting the recommendation further comprises:

determining correlations of the one or more media content elements assigned to the user with media content element ratings for one or more respective media content items; and ranking the respective media content items based on the respective correlations.

20. The machine-readable storage medium of claim 19, wherein the method further comprises:

updating, for the respective media content items, ratings for media content elements, based on the respective correlations.

\* \* \* \* \*